United States Patent [19]

Lampert

[11] 4,175,772
[45] Nov. 27, 1979

[54] VEHICLE SUSPENSION SYSTEM HAVING AUXILIARY SPRING FOR LIGHTLY LOADED CONDITIONS

[75] Inventor: Albert J. Lampert, San Clemente, Calif.

[73] Assignee: Cambria Spring Company, Los Angeles, Calif.

[21] Appl. No.: 783,661

[22] Filed: Apr. 1, 1977

[51] Int. Cl.² .............................................. B60G 11/04
[52] U.S. Cl. ...................................... 280/718; 267/46; 267/56
[58] Field of Search ....................... 267/41, 40, 42, 44, 267/43, 45, 54, 46, 56, 55; 280/718

[56] References Cited

U.S. PATENT DOCUMENTS

| | | | |
|---|---|---|---|
| 1,558,017 | 10/1925 | Kintz | 267/46 |
| 1,632,993 | 6/1927 | Brush | 267/46 |
| 1,858,930 | 5/1932 | Hoover | 267/45 |
| 3,194,580 | 7/1965 | Hamlet | 267/46 |
| 3,434,734 | 3/1969 | Poulos | 267/56 |

FOREIGN PATENT DOCUMENTS 746322  3/1956  United Kingdom ..................... 280/718

*Primary Examiner*—Philip Goodman
*Attorney, Agent, or Firm*—Fulwider, Patton, Rieber, Lee & Utecht

[57] ABSTRACT

A vehicle suspension system in which an auxiliary spring having a lower spring rate than the mainspring provides a resilient ride under empty or lightly loaded conditions by urging the mainspring toward the lower limit of its vertical travel. The auxiliary spring, which can be added to an existing suspension system of conventional design, extends continuously, without any stress concentrating reverse bends, from a selected point of attachment on the bottom of the frame to a hanger that retains an end of the mainspring. To accommodate differences in vehicle construction and make fine adjustments in the auxiliary spring rate, the point of attachment of the auxiliary spring to the frame can be varied or a wedge between the spring and the frame can be repositioned.

8 Claims, 6 Drawing Figures

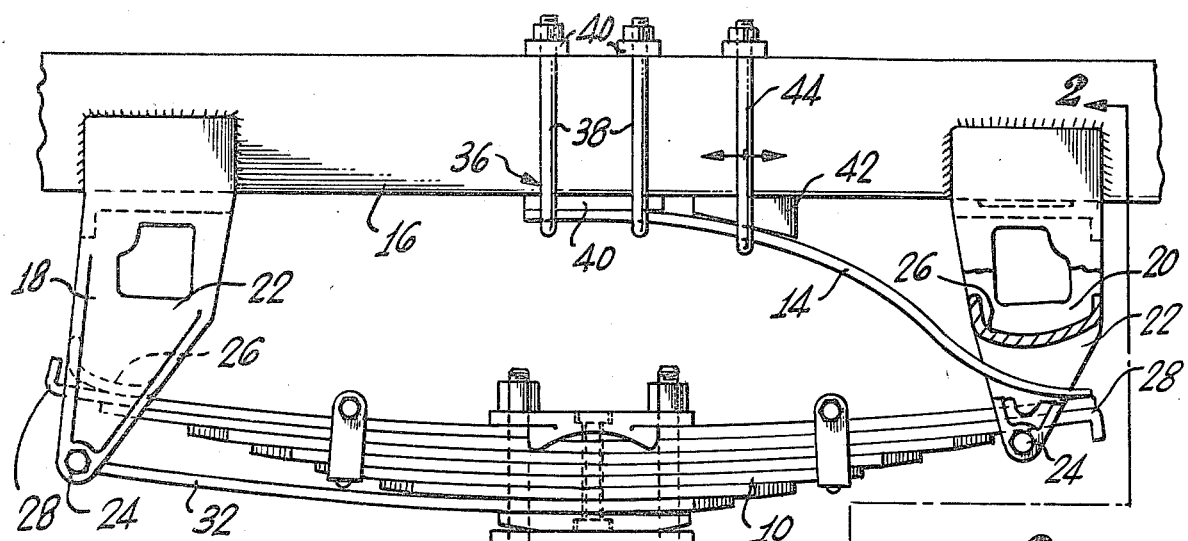
Fig. 1
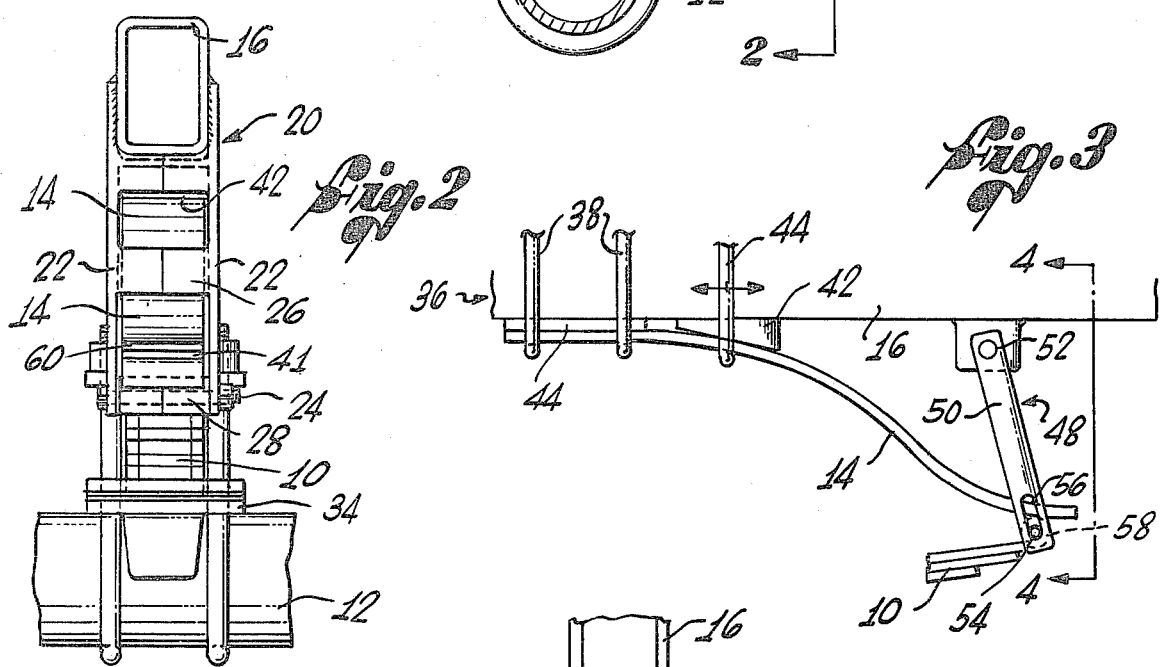
Fig. 2
Fig. 3
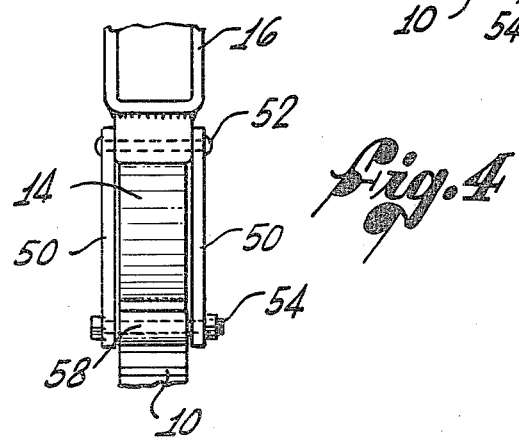
Fig. 4

VEHICLE SUSPENSION SYSTEM HAVING AUXILIARY SPRING FOR LIGHTLY LOADED CONDITIONS

BACKGROUND OF THE INVENTION

The present invention relates to vehicle suspension systems, and more particularly to suspension systems that include an auxiliary spring on which a vehicle rides when lightly loaded.

Vehicles that are intended to carry heavy loads have suspension systems with appropriately high spring rates. When the vehicle is empty or only lightly loaded, the relatively small forces acting on the springs are not sufficient to produce significant deflections and the vehicle has an extremely rigid ride. The lack of effective spring action is not only jarring and uncomfortable, but is dangerous because an unsprung axle has poor traction.

While the above problems of heavy duty suspension systems are most commonly associated with trucks and semi-trailers, they are shared by other types of vehicles as well. Off-the-road vehicles, such as dune buggies, for example, are usually provided with very rigid springs in relation to their weight to withstand the rough treatment for which they are intended. When driven on smooth paved highways, their suspension systems are largely ineffective.

To overcome the above problems, some heavy duty suspension systems have been provided with auxiliary springs having a relatively low spring rate that are positioned between the frame of the vehicle and the main leaf springs. When the vehicle is lightly loaded, it is given a resilient ride by the auxiliary springs while the mainsprings remain relatively rigid. When heavily loaded, however, the auxiliary springs assume a fully flexed position and the vehicle rides on the mainsprings.

A suspension system, known as the "Empty Ride System" that includes generally U-shaped auxiliary springs for lightly loaded conditions is disclosed in U.S. Pat. No. 3,194,580, issued to B. C. Hamlet on July 13, 1965. That system, however, requires specially designed hangers for the main leaf springs and, therefore, is not well suited for attachment to the many existing vehicles that are not equipped with auxiliary springs. Moreover, Hamlet's system, while used on many trucks, has not been adapted for use on off-the-road vehicles. Another problem associated with the Hamlet suspension system is that the configuration of the auxiliary springs includes a reverse bend, and the stresses on those springs are concentrated at the bend, thereby limiting their useful life.

The primary objective of the present invention is to provide a suspension system having improved and longer lasting auxiliary springs that can be readily added to existing vehicles despite variations in the configuration of the frames and springs of those vehicles. Another objective is to provide a suspension system having auxiliary springs that is well suited for use on off-the-road vehicles.

SUMMARY OF THE INVENTION

The present invention comprises a vehicle suspension system for use with heavy loads or under off-road conditions that nevertheless provides a smooth, resilient ride under empty or lightly loaded conditions. It utilizes an auxiliary spring that extends along the frame of the vehicle to a hanger where it engages a stiffer mainspring urging the mainspring toward the lower limit of its range of travel.

In a preferred form of the invention, the auxiliary spring is attached to the vehicle frame by a bracket and extends continuously, i.e., without reverse bends or U-shaped formations, from the bracket toward the hanger where it engages the top of the mainspring. When the vehicle is not heavily loaded, the auxiliary spring forces the mainspring downwardly within the hanger, and the vehicle is provided with a resilient ride by the flexing of the auxiliary spring, while the mainspring remains substantially rigid. When heavily loaded, however, the frame moves downwardly against the bias of the auxiliary spring to the fullest extent permitted by the hanger, and resiliency is then provided by the flexing of the mainspring.

In order that the auxiliary spring can be adapted to a variety of frame and hanger configurations, it is formed by one or more leaves which have a predetermined curvature enabling them to engage the mainspring at selected distances from the point of attachment to the frame. It can be further adapted by repositioning a wedge clamped to the frame at a selected location between the bracket and the hanger. In another embodiment of the invention, the wedge is carried by a rod that extends along the frame from the bracket toward the hanger, and the position of the wedge can be adjusted by a nut that engages threads on the rod. It is generally possible to modify the leaf spring suspension systems in existing vehicles by adding the auxiliary spring band bracket which can be sold separately in the after market as an accessory.

Other features and advantages of the present invention will become apparent from the following description, taken in conjunction with the accompanying drawings which illustrate, by way of example, the principles of the invention.

BRIEF DESCRIPTION OF THE DRAWINGS

FIG. 1 is a partial side elevational view, with portions in section, of an improved vehicle suspension system including an auxiliary spring in accordance with the present invention;

FIG. 2 is an end view of the suspension system, taken along the line 2—2 of FIG. 1;

FIG. 3 is a fragmentary side elevation of a variation of the suspension system of FIG. 1;

FIG. 4 is a fragmentary end view, taken along line 4—4 of FIG. 3.

DESCRIPTION OF THE PREFERRED EMBODIMENTS

Figure 5:
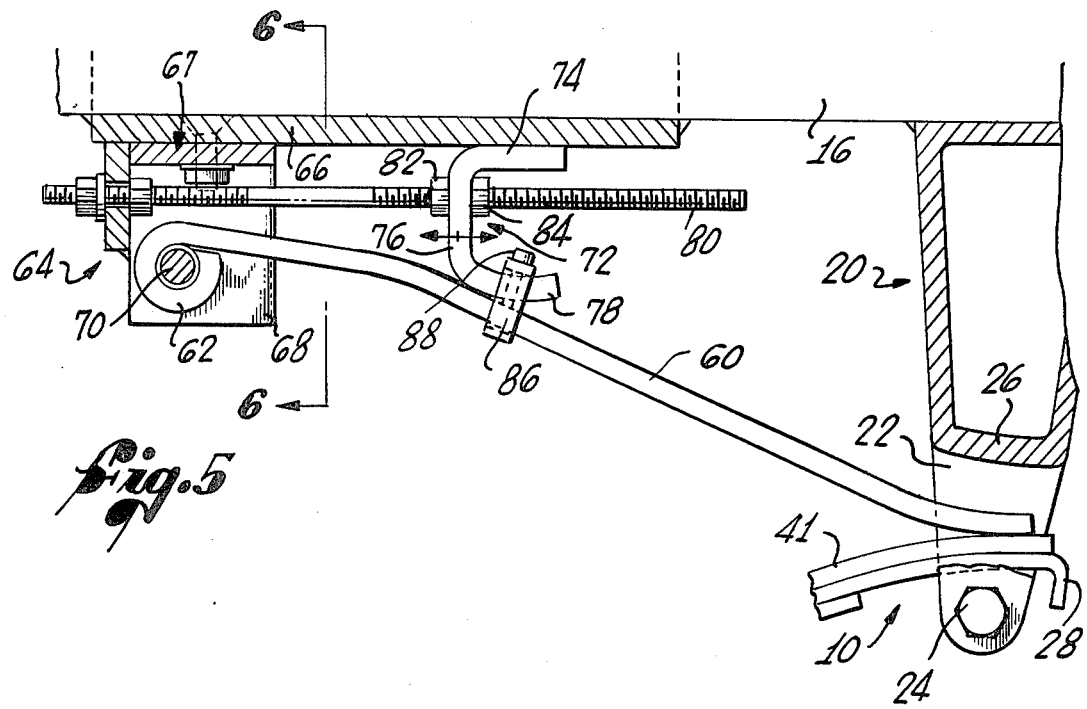
FIG. 5. is a fragmentary cross-sectional side view of another improved vehicle suspension system constructed in accordance with the present invention.

A suspension system for trucks, trailers, off-the-road vehicles and the like, that embodies novel features of the present invention, shown in FIGS. 1 and 2 of the accompanying drawing, provides a relatively high spring rate when heavily loaded and a relatively low spring rate when lightly loaded. Viewed with respect to a single axle of the vehicle, it includes a multi-leaf mainspring 10 attached to an axle 12, and an auxiliary spring 14 inserted between the mainspring and the vehicle frame 16.

The ends of the mainspring 10 are slidably received by two hangers 18 and 20 in the conventional manner. Each hanger includes two parallel side legs 22 that extend downwardly from either side of the vehicle frame 16, the legs being apertured to reduce weight. A horizontal pin 24 spans the opening at the lower ends of the legs 22 and a cross piece 26 extends between the legs above the pin so that the range of vertical travel of the mainspring 10 is limited by the pin and the cross-piece. As the mainspring 10 flexes, the longest top leaves slide through the hangers 18 and 20 to accommodate changes in their horizontal dimension. A downwardly projecting hook 28 on the end of the mainspring 10 prevents it from being withdrawn from the hangers 18 and 20. Longitudinal movement of the mainspring 10 is prevented by a radius arm 32, and the axle 12 is attached to the center of the mainspring 10 by a mounting 34.

The components described above commonly form the basic original equipment of a vehicle suspension system having a single spring rate that is often too high for a safe and comfortable ride when the vehicle is empty or lightly loaded. This system is, however, modified in accordance with the present invention, without replacing the original components, by the addition of the auxiliary spring 14. In this way, the important advantages of an auxiliary spring are readily provided for an existing vehicle of conventional design.

The auxiliary spring 14 is attached to the frame 16 by a bracket 36 formed by a pair of U-shaped bolt members 38, that extend across the bottom of the auxiliary spring and embrace the sides of the frame. The top ends of each U-shaped member 38 are connected by a plate 40 to tightly clamp the frame 16.

The auxiliary spring 14 itself consists of a single leaf disposed between the frame 16 and the mainspring 10 that extends continuously along the frame from the bracket 36 toward the rear hanger 20 in which it is inserted. It has a slight S-curve so that it bends away from the frame 16 toward the mainspring 10 as it extends toward the hanger 20, hereby biasing the mainspring downwardly. Although the spring rate of the auxiliary spring 14 is substantially lower than that of the mainspring 10, it is high enough to lift the weight of the vehicle when empty, urging the mainspring against the pin 24 at the lower limit of its vertical travel. Accordingly, the empty vehicle rides on the auxiliary spring 14 while the mainspring 10 remains relatively rigid. Because of its gentle curvature and the absence of any reverse bends or other sharp deformations, the auxiliary spring 14 can be expected to have a relatively long operational life.

The curvature of the auxiliary spring 14 is such that it can readily be made to accommodate vehicle frames and hangers of a variety of dimensions and configurations by selecting the appropriate attachment point at which the bracket 36 is connected to the frame 16. Further adjustment is possible by positioning a shim 40 between the frame 16 and the top surface of the auxiliary spring 14. If necessary, the rear hanger 20 can be extended downwardly to increase the vertical travel of the mainspring 10.

On the underside of the frame 16 between the bracket 36 and the hanger 20, a wedge 42, attached to the frame by a clamp 44, restrains upward bending of the auxiliary spring 14 and thereby increases the auxiliary spring rate. The clamp 44 is formed by a single U-shaped member that engages the frame 16 in the same manner as the members 28 of the bracket 36. The attachment of the clamp 44 is at a position selected to accommodate the configuration of the frame 16 and make fine adjustments of the auxiliary spring rate.

A variation of the suspension system described above, shown in FIGS. 3 and 4 (similar parts being designated by the same reference numerals), differs with respect to the construction of the rear hanger. Instead of the stationary hanger 20 of FIGS. 1 and 2, it employs a hanger 48 formed by a pair of arms 50 that are pivotably attached to the frame 16 by an upper pin 52. A lower pin 54 connects the arms 50 at their lower ends, slidably engaging longitudinal slots 56 in the arms, and the end of the top mainspring leaf is bent in the shape of an eye 58 to rotatably receive the lower pin. As the mainspring 10 is flexed under a heavy load, thereby increasing its horizontal dimension, the lower ends of the arms 50 pivot away from the bracket 16. In other respects, the operation of the embodiment of FIGS. 3 and 4 is the same as that of FIGS. 1 and 2.

Figure 6:
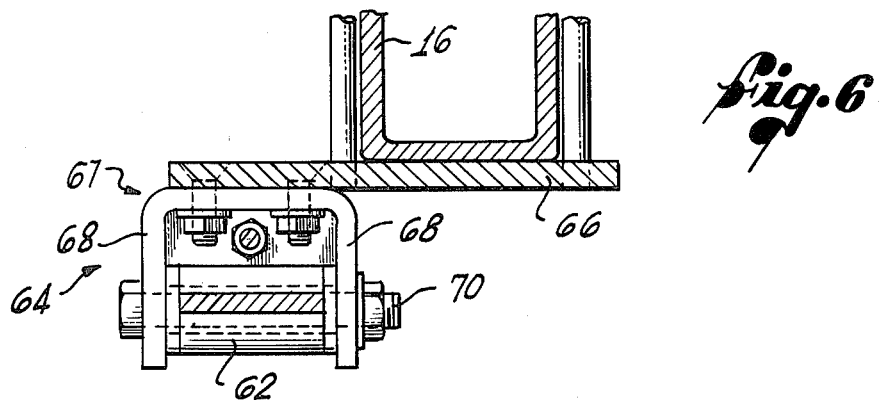
FIG. 6. is a fragmentary cross-sectional view, taken along the line 6—6 of FIG. 5, to show the bracket of that system.

Another embodiment of the invention, shown in FIGS. 5 and 6, employs an auxiliary spring 60 that is bent to form an eye 62 at its bracket end. A bracket 54 that secures the auxiliary spring 14 to the frame 16 includes a horizontal plate 66 secured at a selected location on the underside of the frame. On the bottom of the plate 66 a U-shaped member 67 provides a pair of vertical side pieces 18 that project downwardly from an outboard portion of the plate 66 parallel to the longitudinal axes of the frame, and a horizontal pin 70 connects the side pieces, the pin being offset from the frame 16 and aligned with the rear hanger 20. The eye 62 receives the pin 70 so that the auxiliary spring 14 can pivot on the bracket 64, while its opposite end is inserted in the rear hanger 20 to engage the top of the mainspring 10 in the same manner as in the embodiment described above in connection with FIGS. 1 and 2.

To prevent undesired pivoting of the auxiliary spring 60, a wedge 72 is inserted between the frame and the top surface of the auxiliary spring. The wedge 72 is formed by a cam plate bent so that it is C-shaped when viewed from the side. It includes a horizontal top portion 74 seated against the underside of the frame 16, a vertical forward portion 76 that extends downwardly from the top portion at the end thereof nearest the bracket 64, and a bottom portion 78 that curves back away from the bracket at the lower end of the forward portion. To position the wedge 72 at the point at which it properly urges the auxiliary spring 14 against the mainspring 10, an elongated threaded rod 80 extends rearwardly from the bracket 64, along the frame 16, and through an opening in the vertical portion 76. Two nuts 82 and 84 that engage the threads of the rod 80 are tightened against opposite sides of the forward portion 76 so that the wedge 72 cannot slide along the rod. The wedge 72 can be conveniently repositioned by simply turning the nuts 82 and 84, and fine adjustments in the spring rate of the auxiliary spring 60 can be made by varying the position of the wedge 72. A clip 86 encircles the auxiliary spring 60 and the wedge bottom portion 78 to hold them together, and a set screw 88 is threaded through an aperture in the bottom portion and presses against the top of the spring.

It will be appreciated from the foregoing that the present invention provides an auxiliary spring having a relatively low spring rate for lightly loaded conditions that can be readily added to existing leaf spring suspension systems without major modification. While a particular form of the invention has been illustrated and described, it will be apparent that various modifications can be made without departing from the spirit and scope of the invention.

I claim:

1. A suspension system for a vehicle comprising:
   a main leaf spring connected to at least one axle of said vehicle;
   hanger means attached to the frame of said vehicle for retaining said mainspring while permitting vertical travel thereof within a predetermined range;
   an auxiliary spring attached to said frame and disposed between said frame and said mainspring, said auxiliary spring extending continuously along said frame toward said hanger means from the point of attachment thereof to said frame and downwardly biasing said mainspring toward the lower limit of said range of travel, said auxiliary having a portion adjacent said point of attachment that is substantially parallel with said frame and a portion of said auxiliary spring located between said point of attachment and said hanger having a slight S-curvature, said auxiliary spring having a spring rate substantially lower than that of said mainspring, whereby said vehicle rides on said auxiliary spring when lightly loaded but rides on said mainspring when heavily loaded; and
   a wedging member attached to said frame and engaged by said auxiliary spring, for flexing of said spring thereat in both vertical directions said wedging member being disposed between said hanger means and the point of attachment of said auxiliary spring to said frame, the force exerted on said mainspring by said auxiliary spring being dependent on the position of said wedging member.

2. The suspension system of claim 1 further comprising clamp means for clamping said wedging member to said frame at a selected location.

3. The suspension system of claim 1, wherein said auxiliary spring is attached to said frame by a plurality of U-shaped members.

4. The suspension system of claim 1 further comprising bracket means for attaching said auxiliary spring to said frame at a selected location, said auxiliary spring having a predetermined curvature whereby it engages said mainspring at different distances from said bracket means, depending upon the point of attachment to said frame selected for said bracket means.

5. The suspension system of claim 4 further comprising:
   an elongated member extending from said bracket means toward said hanger means;
   a wedging member carried by said elongated member and engaged by said frame and said mainspring; and
   means for adjustably positioning said wedging member on said elongated member.

6. The suspension system of claim 5, wherein said elongated member is externally threaded and said adjusting means comprises a nut that engages said threads.

7. The suspension system of claim 5, wherein said bracket means includes a pin and said auxiliary spring rotatably engages said pin at one end thereof.

8. The suspension system of claim 5, wherein said wedge is a C-shaped cam plate.

* * * * *